Jan. 1, 1924
E. KLIFOUSS
DUMPING VEHICLE
Filed Feb. 9, 1921

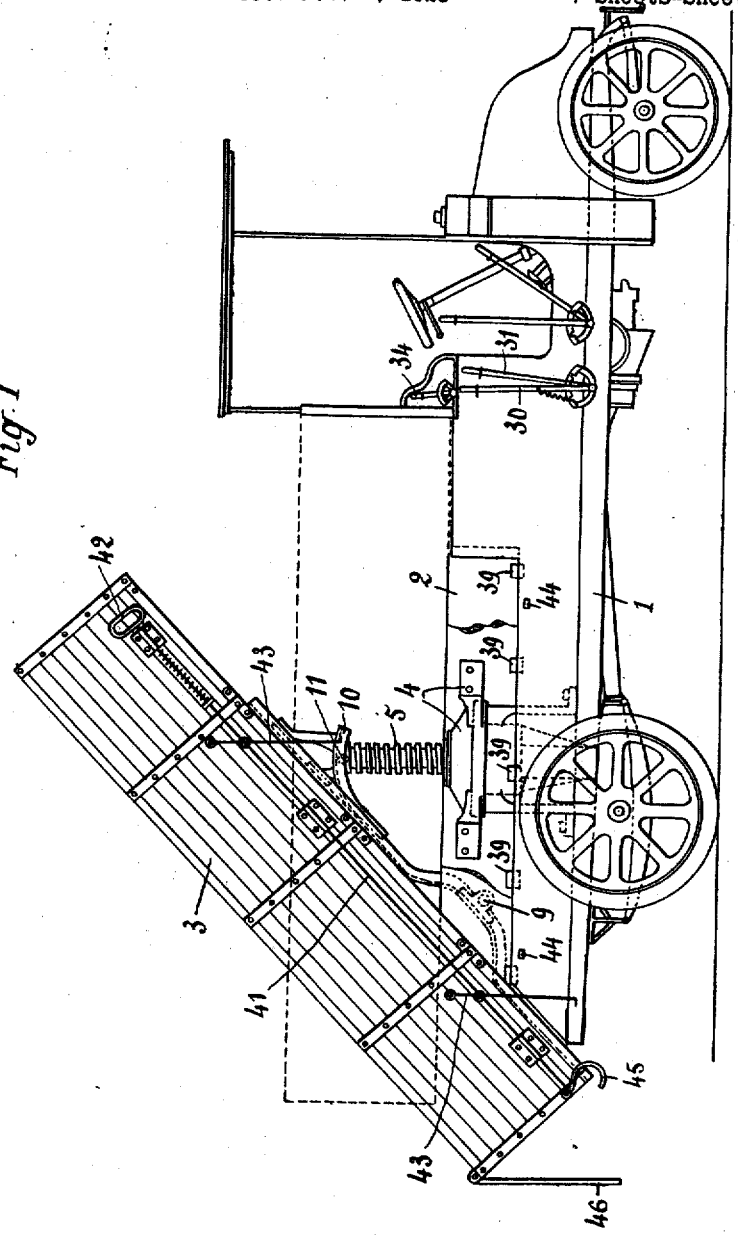

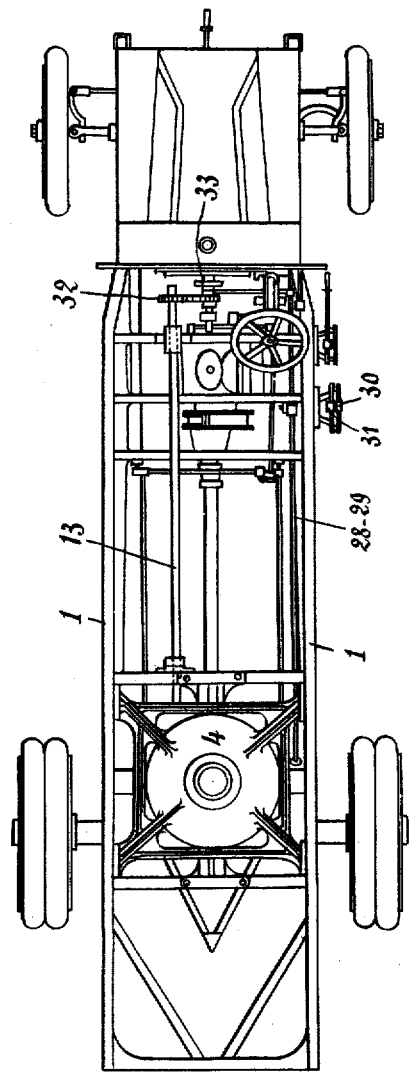

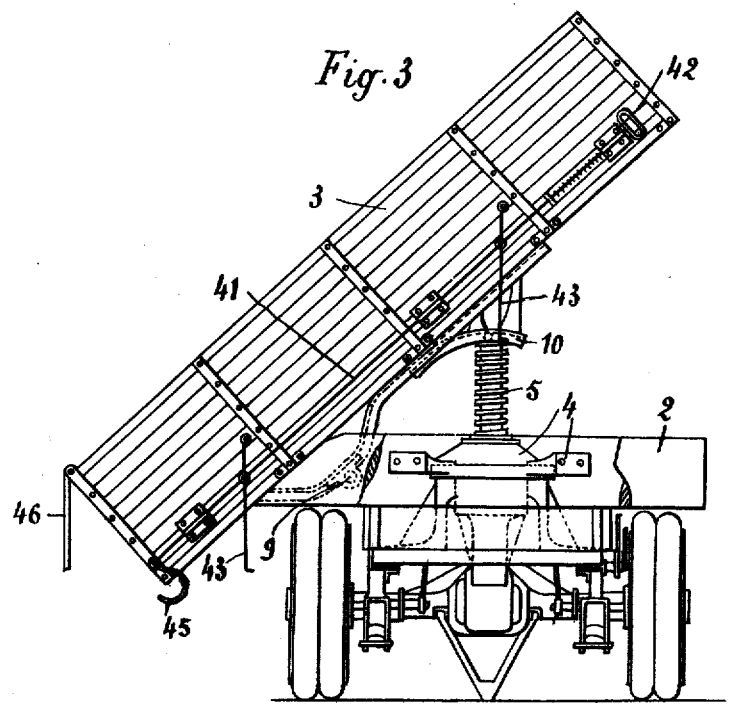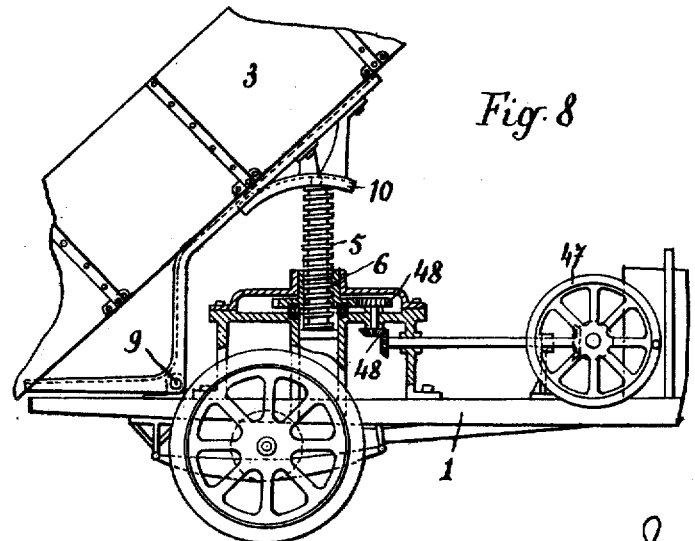

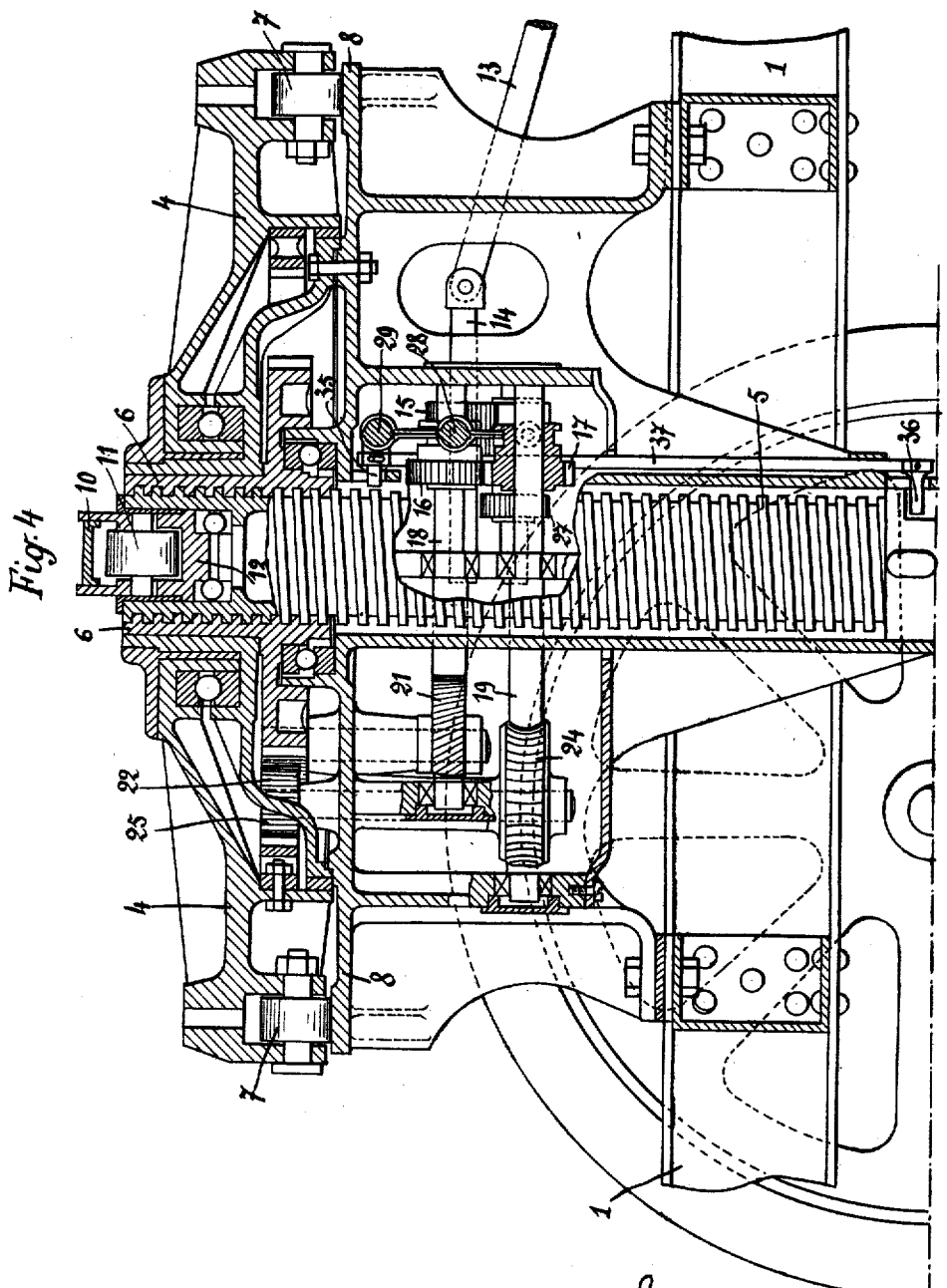

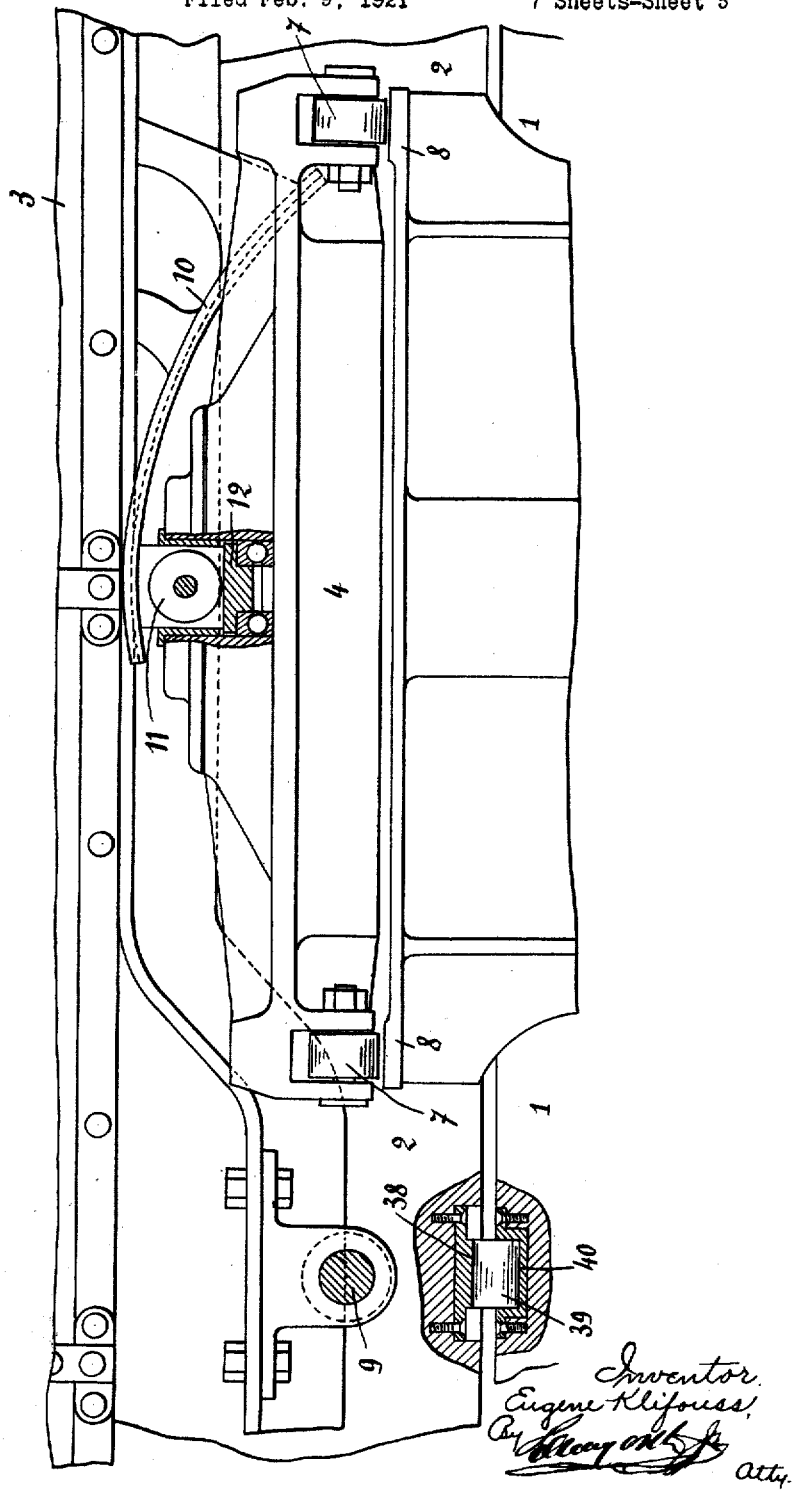

Patented Jan. 1, 1924.

1,479,548

UNITED STATES PATENT OFFICE.

EUGÈNE KLIFOUSS, OF PARIS, FRANCE.

DUMPING VEHICLE.

Application filed February 9, 1921. Serial No. 443,546.

*To all whom it may concern:*

Be it known that I, EUGÈNE KLIFOUSS, a Russian subject, of 9 Rue Claude Bernard, Paris, in the Republic of France, have invented certain new and useful Improvements in Dumping Vehicles; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to automobile vehicles provided with a tipping or rotating body.

There exist already numerous types of automobile vehicles with a tipping body; there are also vehicles the body of which is at the same time tipping and rotating; in the latter types the operation of the rotation and of the tipping are effected by two entirely independent mechanisms. Particularly, when the lifting and the tipping are produced by a screw-jack, the latter is entirely independent of the vertical pivot about which the rotation takes place, so that the effort to lift the weight of the body and its load is an oblique effort which only permits a very bad utilization of the available motive power; on the other hand the screw-jack directly engaging the body can only communicate to the latter a lifting movement the length of which is limited, being equal to the length of the course of the screw-jack itself, which is necessarily limited by the space available on the chassis of the vehicle.

The invention has for its object an improved mechanism for the operation and control of the rotation and of the tipping of vehicle bodies of this kind, which allows these various drawbacks to be eliminated by combining in one and the same construction the tipping mechanism and the pivot and control of the rotating motion. This is done by always maintaining vertical the reaction of the body upon the lifting screwjack and by simultaneously multiplying in a suitable proportion the lifting motion of the car body with respect to the lifting movement of the screw-jack. This arrangement which reduces considerably the space occupied by the mechanism, has the advantage to secure for it an easy upkeep and lubrication, together with a utilization of the motive power which is always complete and advantageous.

The system comprises also the use of auxiliary devices adapted to avoid any stress on the rotating mechanism on the road in transit, and to secure the proper housing of the body in the position which it is intended to occupy on the road.

Referring to the appended drawings which illustrate an automobile with rotating and tipping body provided with an improved mechanism constructed in accordance with the invention:—

Fig. 1 of these drawings is a side view of the vehicle, the body being shown lifted for unloading from the rear.

Fig. 2 is a plan with the body removed in order to allow the operating mechanism to be seen.

Fig. 3 is a rear view of the vehicle, the body being in the required position for unloading sideways.

Fig. 4 is a vertical section showing in detail on a larger scale the mechanism of rotation and of tipping.

Fig. 5 is a side view of the latter mechanism in the position it occupies on the road.

Fig. 8 is a part longitudinal section of a vehicle of simpler construction in which the body is adapted only to tip, the tipping being operated by hand.

Figure 6:
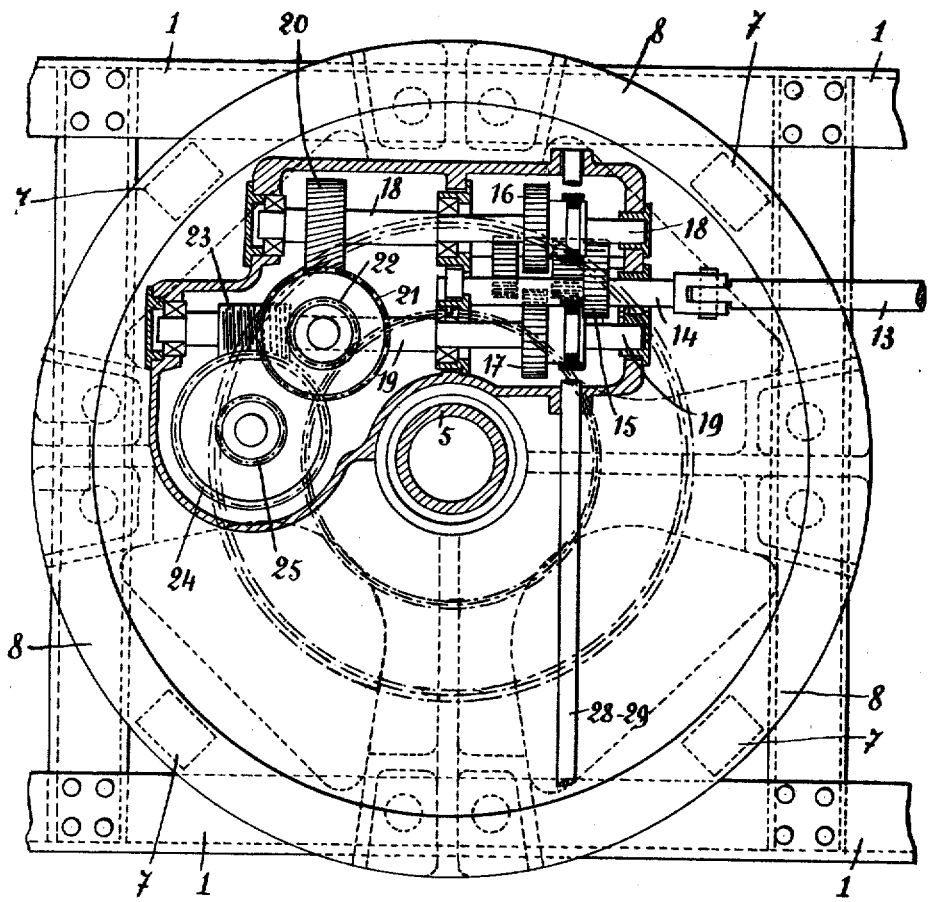
Fig. 6 is a plan view of the same mechanism.

The automobile vehicle to which the invention is applied is a vehicle of the ordinary type, of the kind shown on Figs. 1 to 3. On the longitudinal members 1 of the chassis of this vehicle is resting, in a manner which will be described later on, a frame 2 which carries the whole of the mechanism for the operation of the rotation and of the tipping of the body 3. The base 4 of the lifting screwjack is secured on this frame, the screw 5 being operated by a threaded socket 6 constituting a nut, which is itself adapted to rotate in the central socket of the base 4. The latter is provided on its periphery with rollers 7 adapted to travel on a rail plate 8 integral with the chassis 1 of the vehicle.

The body 3 is hinged at its rear portion at 9, on the frame 2. It is provided underneath with a guiding rail 10 on which travels a roller 11 carried by the head 12 of the screw 5 of the screw jack; this head 12 is mounted on ball bearings on the upper end of the screw and it is continued at its upper portion by two lateral cheeks, between which the guiding rail 10 of the body is adapted to fit.

Owing to this arrangement the head of the screw jack is perfectly guided along the guiding rail during the whole of the lifting movement. As is shown in the drawing the guide 10 has a curved shape, its rear end resting directly upon the bottom of the body 3, while its forward end is distant from this bottom by a suitable amount so calculated that the effort exerted on the head of the screw when lifting the load of the body is always exactly vertical.

As it is easily understood, this special arrangement of the guide 10 has the advantage of increasing the tipping angle of the body relatively to that of the motion of the screw jack.

Figure 7:
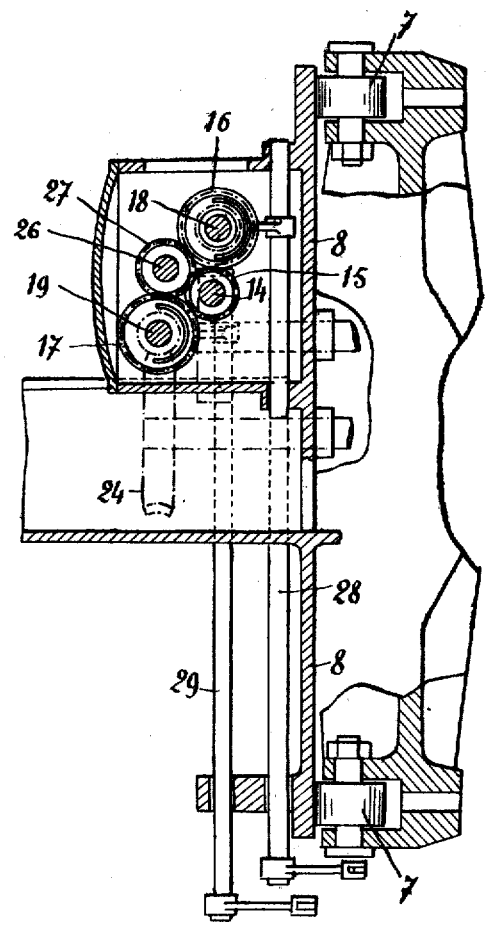
Fig. 7 is a part transversal section of this mechanism through the casing of the controlling gear.

The operation of the mechanism is obtained by means of a shaft 13 which can be put in motion by the motor of the vehicle, as will be seen later on. This shaft actuates the principal shaft 14 of a gear box, said shaft 14 being provided, Fig. 7, with a toothed wheel 15 with which one or the other of two shiftable gears 16 and 17 mounted on the secondary shafts 18 and 19 can be, respectively, brought into engagement.

The shaft 18 operates the nut 6 of the screw-jack by means of the helical gearing 20, 21 and of the toothed wheel 22, to effect the lifting movement of the body, which tips about its hinge 9; the shaft 19 drives the internal gear on the base 4 of the screw-jack by means of the worm and worm wheel 23, 24, and the toothed wheel 25, that is to say, it rotates the frame 2 together with the body supported by the latter, about the vertical axis of the screw-jack. An intermediate shaft 26 provided in the gear box with a toothed wheel 27 that is continuously driven from gear wheel 15 by shifting wheel 17 from neutral position, Fig. 6, into engagement with wheel 27 allows the reversal of the motion. The control of the shiftable gears is obtained by means of two rods 28 (for the wheel 16) and 29 (for the wheel 17), which can themselves be operated from the driver's seat respectively by means of two controlling levers 30 and 31 (Figs. 1 and 2). The operating shaft 13, which is actuated by the shaft of the motor by means of a suitable transmission gear 32, can be coupled with the said motor shaft by means of a clutch 33 the working of which is controlled by a lever 34 situated within reach of the driver Fig. 1.

At the end of the ascending or descending course of the screw jack the latter produces automatically the shifting of the transmission by means of stops 35 and 36 mutually connected to a vertical rod 37, Fig. 4, and which, when they are engaged by the lower widened part of the screw 5, act upon the rod 28 so as to cause automatically the stoppage of the motion of the screw jack by partially rotating rod 29 in one direction by stop 35, and in the other direction by stop 36 when moved by the cylindrical base portion of said screw 5. The rod 28 then acts upon the lever 30 which it displaces slightly on its sector, and which is adapted to be brought back to its neutral position by means of a suitable spring, a mechanism customarily used for this purpose.

As it is seen, the whole of the mechanism of the screw jack and the operating gearings constitute one single whole, located in a single casing which ensures a proper preservation and allows an easy upkeep and lubrication while considerably reducing the space required.

The frame 2 carries underneath two series of slopes or inclines such as 38 which, when the body is swung in its normal or road position, bear upon the rollers 39 fitting in corresponding recesses 40 of the chassis (Fig. 5). These slopes 38 have such an outline that in this normal position of the body the frame 2 is slightly lifted so that the rollers 7 do not any more bear upon the fixed rail plate 8 (see Fig. 5).

The car body may be advantageously provided with a clamping device constituted as follows: on one of the long sides of the body 3 (Fig. 1) is arranged a rod 41 provided at its front end with a handle 42; to this rod are secured levers 43 pivoted on the body and the lower end of which is provided with hooks adapted to engage lugs 44 carried by the chassis when the body is horizontal. The rear end of the same rod 41 can be connected to a hinged hook 45 intended to engage the rear door 46 of the body when it is closed down against the body itself. After the body is brought back to its horizontal position it will only be necessary to pull the handle 42 and to fasten it, for instance by rotating it, to secure the body and its rear door simultaneously in position.

It will be understood that the driver of the vehicle can, from his seat, first clutch the mechanism by means of the lever 34, then, in moving the lever 31, cause the rotation of the frame 2 and the body it carries so as to swing it into the required horizontal angular position and finally, in actuating the lever 30, produce the tipping of the body to unload the material which it contains either on the rear or in any required angular position. The inverse operation can be produced by means of the same levers 30 and 31 so as to bring back the body in its normal or road position. From his seat also the driver can by means of the handle 42 secure the body and its rear door in position. On the road, as it has been indicated above, the rollers 7 of the base 4 of the screw jack are lifted above their rail plate so that these two parts cannot be bent or damaged by the shocks due to the roughness of the road.

One could also in order to simplify the mechanism simply arrange the body as a tipping body as has been shown Fig. 8, the tipping motion being then operated either by means of the motor or by hand by means of a lateral handle wheel 47. The head of the screw jack acts then as previously described upon the lower curvilinear portion of the guiding rail 10 of the body, and the operation of the screw jack can be performed by gearing 48 actuated by the handle wheel 47.

The mechanism of rotation and tipping of the body which has been described can, as may be understood, be applied to the vehicles of all kinds due to its small space.

I claim—

1. In a dumping vehicle, the combination with a chassis, a frame capable of rotating horizontally on said chassis, and a body pivoted in said frame; of a lifting screw on the chassis, a curvilinear guide on said body having sliding bearing on the end of said screw, motor-operated mechanism mounted on said chassis and means on said frame actuated by said motor mechanism, to either rotate said frame and body or to operate said screw.

2. In a dumping vehicle, the combination with a chassis and a pivoted body; of a curvilinear guide rail on said body and a lifting screw on said chassis, the end of said screw engaging said guide, said guide facilitating the lifting movement while maintaining the line of reaction of said body and screw vertical.

3. In a dumping vehicle, the combination with a chassis, a frame thereon capable of rotating horizontally and a body pivoted to said frame; of a lifting screw-jack on said chassis, operating mechanism on the chassis, means on said frame actuated by said mechanism to operate said screw and swing said frame, and devices between said frame and chassis to relieve the weight of said means on said jack when the body is in normal position.

4. In a dumping vehicle, the combination with a chassis, a frame thereon capable of rotating horizontally and a body pivoted to said frame; of a lifting screw-jack on said chassis, means on said frame for operating the screw-jack, motor-operated mechanism to actuate said means, stop means on said screw and stops in the path thereof near the top and bottom of the travel of said screw and devices actuated by said stops to disengage the motor mechanism.

In testimony that I claim the foregoing as my invention, I have signed my name.

EUGÈNE KLIFOUSS.